Feb. 2, 1932. A. ANDREWS 1,843,380
MECHANICAL MOVEMENT
Filed Feb. 25, 1931 4 Sheets-Sheet 1

INVENTOR.
Albert Andrews
BY
H. B. Wilson & Co.
ATTORNEYS.

Feb. 2, 1932. A. ANDREWS 1,843,380
MECHANICAL MOVEMENT
Filed Feb. 25, 1931 4 Sheets-Sheet 2

INVENTOR.
Albert Andrews
BY
A. R. Willson & Co.
ATTORNEYS.

Feb. 2, 1932. A. ANDREWS 1,843,380
MECHANICAL MOVEMENT
Filed Feb. 25, 1931 4 Sheets-Sheet 3
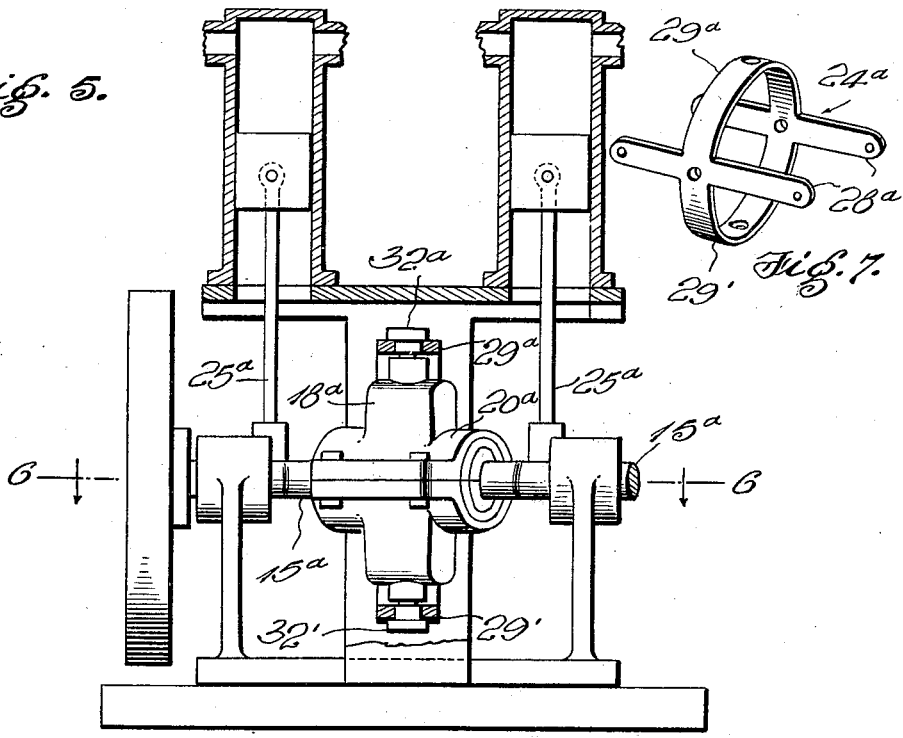
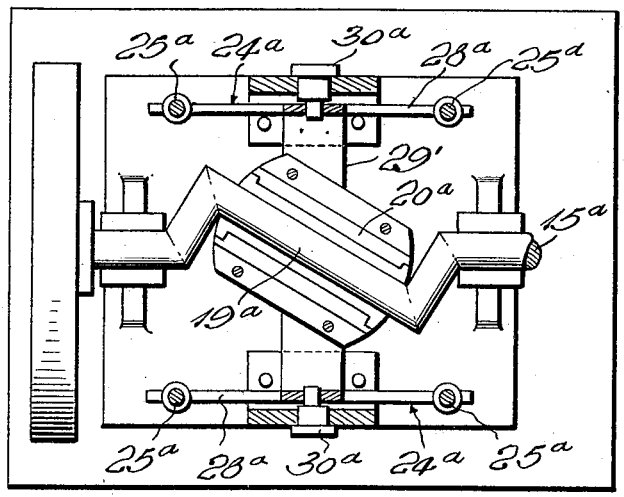
INVENTOR.
Albert Andrews
BY
H. B. Wilson & Co.
ATTORNEYS.

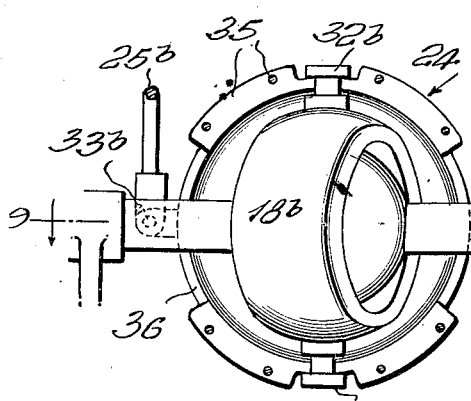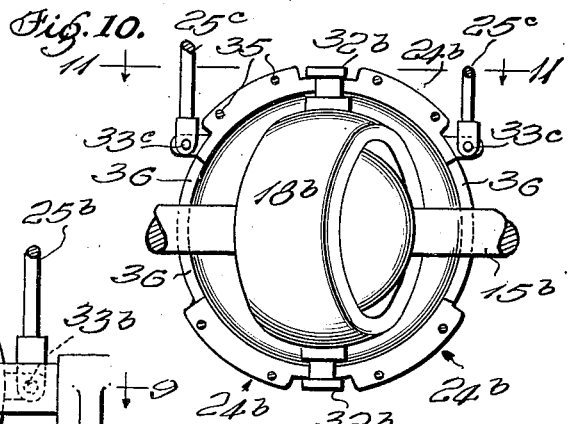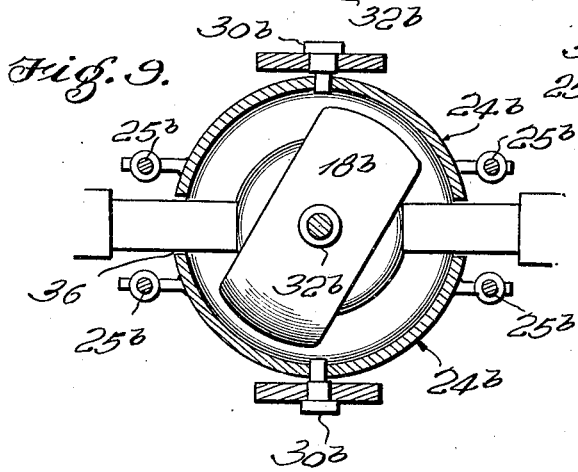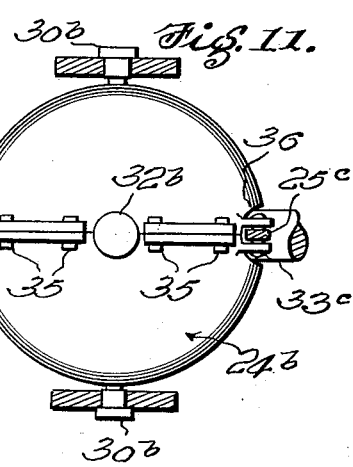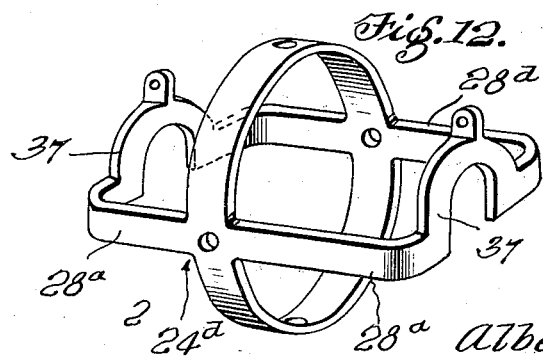

Patented Feb. 2, 1932

1,843,380

UNITED STATES PATENT OFFICE

ALBERT ANDREWS, OF DEADWOOD, SOUTH DAKOTA

MECHANICAL MOVEMENT

Application filed February 25, 1931. Serial No. 518,191.

The invention relates to mechanical movements for converting reciprocatory into rotary motion or vice versa, and while it is herein disclosed for transmitting motion from pistons to a shaft, it is to be understood that it is not restricted to any particular field of use.

One object of the invention is to provide a new and improved construction and relation of elements for smoothly converting reciprocatory into rotary motion or vice versa, embodying reciprocatory members transverse to the shaft.

Another object of the invention is to provide an advantageous construction which is well adapted for use in the manufacture of engines having cylinders ranging in number from one to eight.

With the foregoing in view, the invention resides in the novel subject matter hereinafter described and claimed, description being accomplished by reference to the accompanying drawings.

Fig. 5 is a side elevation partly broken away and in section, showing a different form of construction.

Fig. 6 is a horizontal sectional view substantially on line 6—6 of Fig. 5.

Fig. 7 is a perspective view of the lever shown in Figs. 5 and 6.

Fig. 8 is a vertical sectional view partly in elevation showing a lever in the form of a hollow casing, for a four or eight cylinder engine or the like.

Fig. 9 is a horizontal sectional view on line 9—9 of Fig. 8.

Fig. 10 is a view similar to Fig. 8 but showing the construction used for a two cylinder engine or the like.

Fig. 11 is a horizontal sectional view on line 11—11 of Fig. 10.

Fig. 12 is a perspective view similar to Fig. 7 but showing a lever adapted for a two cylinder engine or the like instead of four.

Figure 1:
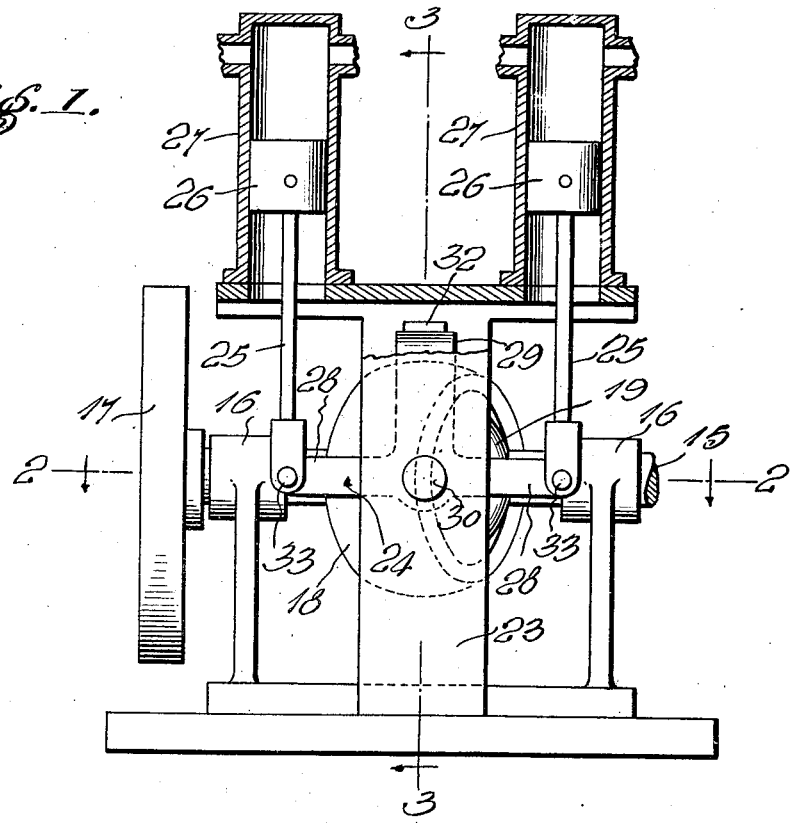
Fig. 1 is a side elevation partly in vertical section.
Figure 2:
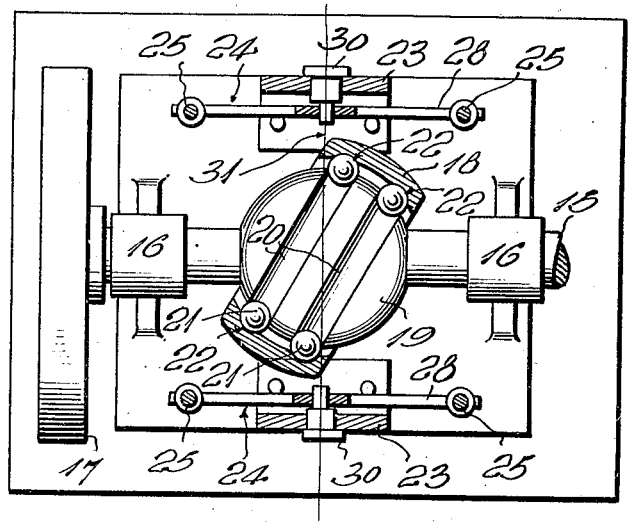
Fig. 2 is a horizontal sectional view substantially on line 2—2 of Fig. 1, parts however being in elevation.
Figure 3:
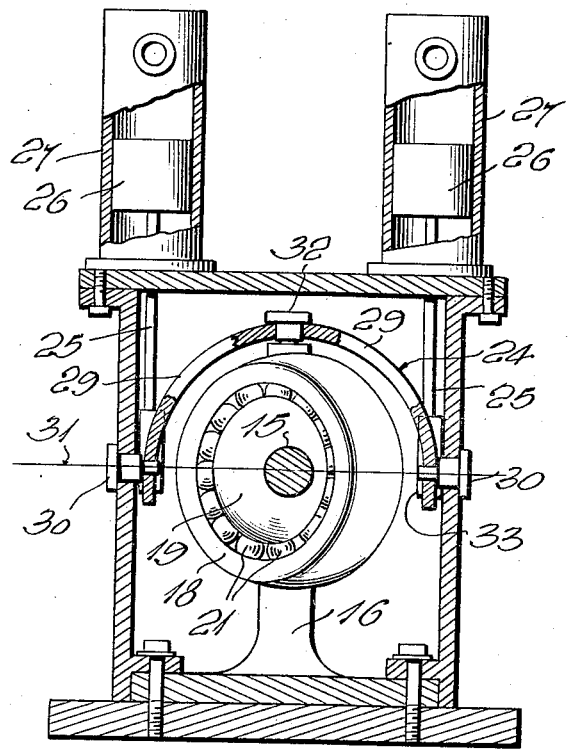
Fig. 3 is a vertical transverse sectional view substantialy on line 3—3 of Fig. 1.
Figure 4:
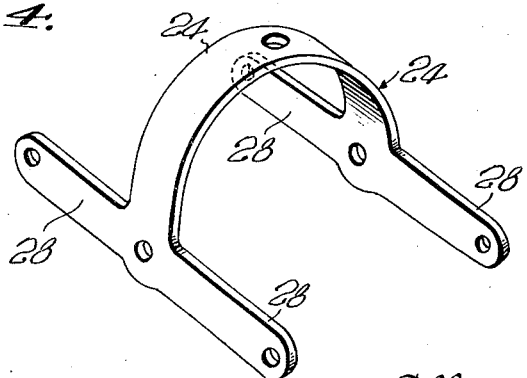
Fig. 4 is a perspective view of the lever embodied in Figs. 1, 2 and 3.

In the form of construction shown in Figs. 1 to 4, the numeral 15 denotes a shaft mounted in appropriate bearings 16 and having a fly-wheel 17. An annular wobbler 18 circumscribes the shaft 15 and the latter is provided with means for wobbling said wobbler. A ball 19 or a central section of a ball is either secured to or integral with the shaft 15 and is provided with continuous ball races 20 in planes oblique to said shaft. Bearing balls 21 are engaged with these races and with other races 22 in the wobbler 18. While two sets of balls and races are shown, any desired number of sets could of course be used. In fact, the gist of the present invention is not concerned with any particular means for connecting the wobbler operatively with the shaft.

For illustrative purposes, two fixed supports 23 are shown spaced outwardly in opposite directions from the shaft 15 and the wobbler 18. In an engine, compressor or the like, the equivalents of these supports 23 may be formed by opposite walls of a crank case or the like. A novel lever member 24 is mounted on the supports 23, is connected with the wobbler 18, and is also connected with four piston rods or connecting rods 25. Two of these rods are at one side of the shaft 15 and two at the other side thereof, and two of said rods are spaced in one direction from the fulcrum axis of the lever 24, while the other two are spaced in the opposite direction from said axis. When constructing a four cylinder engine or the like, all of the rods 25 will extend in the same direction, as shown, and will be connected with the pistons 26 of the four cylinders 27. In constructing an eight cylinder machine, in addition to extending four of the rods 25 in the direction herein shown, four more would be extended in the opposite direction and connected with the pistons of additional cylinders.

The lever 24 embodies two opposed, elongated side portions 28 and an arched connecting portion 29 whose ends are integral with the central portions of said side portions 28. These side portions are interposed between the wobbler 18 and the supports 23 and their centers are connected by two alined fulcra 30 with said supports, said fulcra being disposed on a line 31 which extends diametrically through the shaft 15 and through the central point of the ball or the like 19. The lever portion 29 is disposed at the periphery of the wobbler 18 and is connected by a pivot 32 with said periphery of the wobbler. This pivot 32 is positioned radially of the wobbler 18 and is at 90° to the line 31, being disposed centrally between the fulcra 30. The ends of the lever portions 28 are connected by pivots 33 with the rods 25 or other reciprocatory members, said pivots 33 being all parallel with the line 31.

Reciprocation of the rods or the like 25 and the described connections between these rods and the shaft 15, produce rotation of the latter. As the rods reciprocate and the shaft rotates, the entire lever 24 simply oscillates about its fulcra 30, and as the wobbler 18 wobbles, it oscillates about the pivot 32. In an engine, each time a cylinder fires, movement is imparted to the lever 24, this lever causes lateral movement of the pivot 32 and said pivot causes movement of the wobbler 18, and the connections between this wobbler and the shaft 15, effect rotation of the latter. Obviously, in a pump or compressor, driving of the shaft 15 would effect reciprocation of the rods or the like 25.

In the construction shown in Figs. 5, 6 and 7, the shaft is denoted at 15$^a$, said shaft having an oblique portion 19$^a$ rotatable in a bearing 20$^a$ with which a wobbler 18$^a$ is provided. This wobbler could be used with the lever 24 above described, but is preferably employed in connection with a somewhat different lever 24$^a$. In addition to embodying two side members 28$^a$ and an arched connecting member 29$^a$, the lever 24$^a$ embodies a lower curved connecting member 29'. The member 29$^a$ is connected by a pivot 32$^a$ with the upper end of the wobbler 18$^a$, and the lower end of said wobbler 18$^a$ is connected by a pivot 32' with the lever portion 29'. The lever portions 28$^a$ are centrally fulcrumed at 30$^a$ and are pivoted to the reciprocatory rods or the like 25$^a$, and the relation of fulcrum and pivots, is the same as above described in connection with Figs. 1 to 4.

The form of construction shown in Figs. 5 to 7 operates in the same manner as that shown in connection with Figs. 1 to 4, the differences being in the form of the wobbler, its connection with the shaft, the construction of the lever 24$^a$, and its double-pivot connection with the wobbler.

In Figs. 8, 9, 10 and 11, the lever for connection with the rods or other reciprocatory members and the wobbler, is in the form of a casing 24$^b$, said casing being preferably of spherical form and constructed from two flanged sections secured together by bolts or rivets 35. The spherical lever 24$^b$ contains the wobbler 18$^b$ which wobbler is pivoted at diametrically opposite points to said member 24$^b$ by axially alined pivots 32$^b$. Member 24$^b$ is fulcrumed at 30$^b$ and is pivoted at 33$^b$ to the rods or the like 25$^b$ (Figs. 8 and 9) or may be pivoted at 33$^c$ to the rods or the like 25$^c$ (Figs. 10 and 11). Four of the rods 25$^b$ are shown, all extending in the same direction but four more could also be employed extending in the opposite direction. Two of the rods 25$^c$ are illustrated and they are connected at points above the shaft 15$^b$. The member 24$^b$ in each instance is provided with slots 36 through which the shaft passes. In Figs. 8 and 9, the pivots 33$^b$ are at opposite sides of the slots 36 and about centrally between the ends of the latter, whereas in Figs. 10 and 11, the pivots 33$^c$ are at the upper ends of said slots.

Fig. 12 discloses a lever member 24$^d$ similar to that shown in Figs. 5, 6 and 7. The side members 28$^d$ of the lever however, are integrally connected at their ends by arched end members 37 to which the rods or other reciprocatory members may be connected.

Any form of construction herein illustrated, will be efficient and desirable from numerous standpoints, but it is to be understood that the invention is not restricted to specific details, nor to use in any particular field.

I claim:—

1. A mechanical movement comprising a shaft, fixed supports disposed at opposite sides of said shaft and spaced therefrom, a wobbler between said supports, means on said shaft for wobbling said wobbler, a unitary lever having opposed portions between said supports and the periphery of said wobbler, and another portion extending between said opposed portions and lying at the periphery of the wobbler, two alined fulcra connecting said opposed lever portions with said supports, said fulcra being disposed on a line extending diametrically through said shaft, a pivot extending radially of said wobbler and connecting the periphery of the latter with said other lever portions, said pivot being at ninety degrees to the aforesaid diametrical line, a reciprocatory member transverse to said shaft, and an additional pivot parallel with and spaced longitudinally of the shaft from said diametrical line, said additional pivot connecting said reciprocatory member with said lever.

2. A mechanical movement comprising a shaft, fixed supports disposed at opposite sides of said shaft and spaced therefrom, a wobbler between said supports, means on said shaft for wobbling said wobbler, a unitary lever having opposed portions between said supports and the periphery of said wobbler, and another portion extending between said opposed portions and lying at the periphery of the wobbler, two alined fulcra connecting said opposed lever portions with said supports, said fulcra being disposed on a line extending diametrically through said shaft, a pivot extending radially of said wobbler and connecting the periphery of the latter with said other lever portion, said pivot being at ninety degrees to the aforesaid diametrical line, four substantially parallel reciprocatory members transverse to said shaft and disposed two at one side of the latter and two at the other side thereof, two of said reciprocatory members being at one side of said diametrical line and two at the other side thereof, and four pivots parallel with said diametrical line and connecting said reciprocatory members with said lever.

3. A mechanical movement comprising a shaft, fixed supports disposed at opposite sides of said shaft and spaced therefrom, a wobbler between said supports, means on said shaft for wobbling said wobbler, a unitary casing surrounding said wobbler, said wobbling means and a portion of said shaft and having slots through which the latter passes, said casing extending between said wobbler and said supports, two alined fulcra connecting said casing with said supports, said fulcra being disposed on a line extending diametrically through said shaft, a pivot extending radially of said wobbler and connecting said wobbler with said casing, said pivot being at ninety degrees to the aforesaid diametrical line, a reciprocatory member transverse to said shaft, and an additional pivot parallel with and spaced longitudinally of the shaft from said diametrical line, said additional pivot connecting said casing with said reciprocatory member.

4. A mechanical movement comprising a shaft, fixed supports disposed at opposite sides of said shaft and spaced therefrom, a wobbler between said supports, means on said shaft for wobbling said wobbler, a unitary lever having two opposed elongated portions interposed between said wobbler and said supports and an arched portion extending from the center of one of said elongated portions to the center of the other of said elongated portions, two alined fulcra connecting said centers of said elongated portions to said supports, said fulcra being disposed on a line extending diametrically through said shaft, a pivot connecting the center of said arched lever portion with the periphery of said wobbler, and four reciprocatory members transverse to said shaft and pivoted to the ends of said elongated lever portions.

5. A mechanical movement comprising a shaft, fixed supports disposed at opposite sides of said shaft and spaced therefrom, a wobbler between said supports, means on said shaft for wobbling said wobbler, a unitary lever having two opposed elongated portions interposed between said supports and said wobbler, a central arched portion connecting the central portions of said elongated portions, and two additional arched portions connecting the ends of said elongated portions, two alined fulcra connecting said centers of said elongated portions to said supports and disposed on a line extending diametrically through said shaft, a pivot connecting the center of said central arched portion with said wobbler, and two reciprocatory members transverse to said shaft and pivoted to said additional arched portions respectively.

In testimony whereof I affix my signature.

ALBERT ANDREWS.